June 14, 1932.  A. G. SLATCHER  1,863,551
AIR LINE LUBRICATOR
Filed Feb. 24, 1928
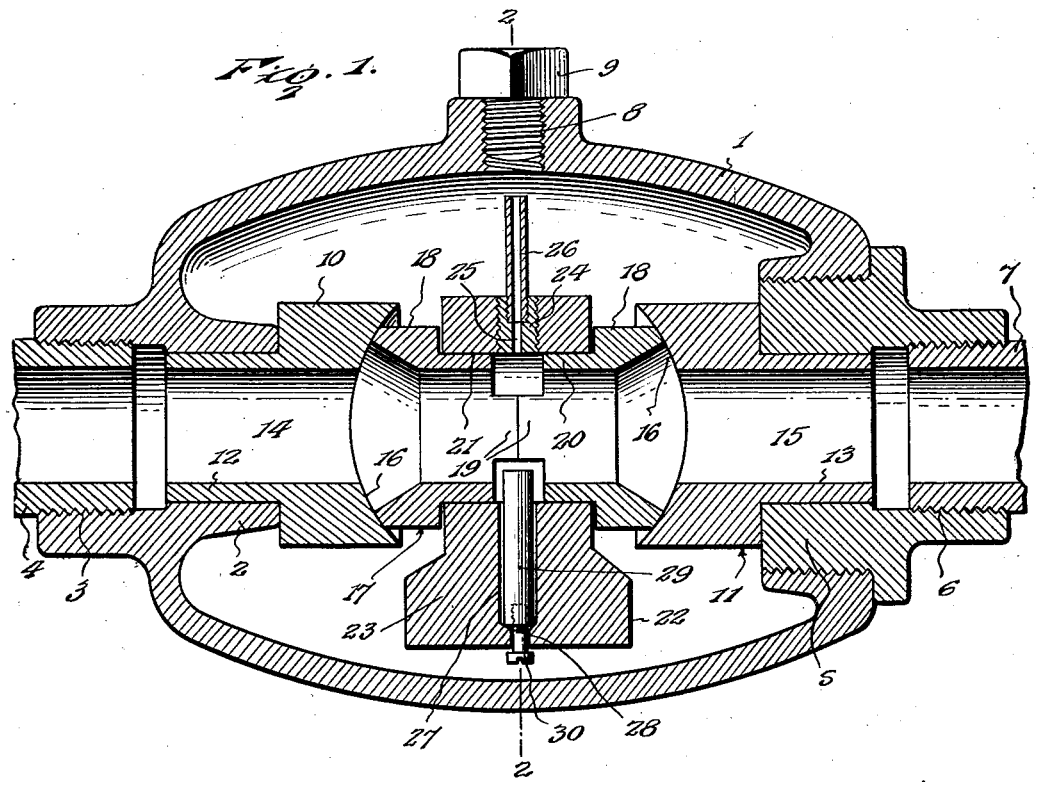
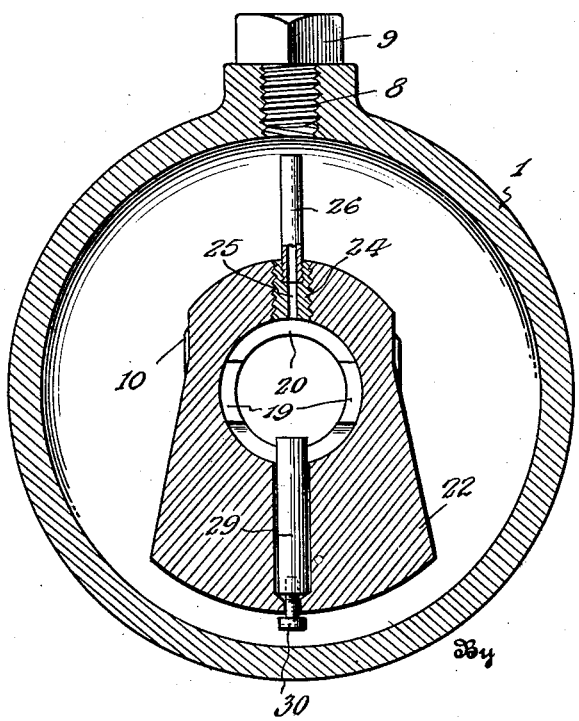

Patented June 14, 1932

1,863,551

UNITED STATES PATENT OFFICE

ALFRED G. SLATCHER, OF CLEVELAND, OHIO, ASSIGNOR TO THE CLEVELAND ROCK DRILL COMPANY, OF CLEVELAND, OHIO

AIR LINE LUBRICATOR

Application filed February 24, 1928. Serial No. 256,626.

The present invention is directed to improvements in air line lubricators.

The primary object of the invention is to provide a device of this character so constructed that a uniform supply of lubricant will be carried to the working parts of a fluid actuated percussive drill only while the same is in operation, thus not only preventing loss of lubricant, but at the same time preventing interruption of the drilling operation for supplying the necessary lubricant.

Another object of the invention, and an important one, is to provide a device of this type constructed in such manner that the air line can assume various positions without affecting the operation of the feed of lubricant when the drill is running.

In the accompanying drawing:—

Figure 1 is a longitudinal sectional view through the device.

Figure 2 is a sectional view on line 2—2 of Figure 1.

Referring to the drawing, 1 designates a reservoir, which is in the nature of a casing and has extending internally therein at one end a collar 2 which is alined with the socket 3 in which is fitted a pipe or hose 4 leading from a suitable source of pressure fluid. The opposite end of the reservoir has threaded therein a collar 5 which carries a socket 6 for engagement with a pipe or hose 7 which conducts air laden with lubricant to the drill or other device, not shown.

The normally upper side wall of the reservoir is provided with an opening 8 through which lubricant is poured, said opening being closed by a screw plug 9.

Trunnions 10 and 11 are employed and include sleeves 12 and 13, respectively, which snugly fit into the respective collars 2 and 5. The trunnions are formed with axial bores 14 and 15, which are disposed in direct alinement in order that the pressure fluid can pass therethrough. The opposed faces of the trunnions are provided with circular recesses 16—16, the purpose of which will appear later.

A hanger 17 is provided for engagement between the trunnions 12 and 13 and consists of complementary tubular sections 18—18, which have their outer faces curved to correspond to the circular recesses 16 and in which they engage. The opposed ends of the sections are provided with spaced lugs 19 which contact in order to hold the sections spaced and against inner endwise movement, the said sections being reduced, as at 20, to provide a sectionalized hub 21.

Supported by the hub 21 is a pendulum which includes a band 22 adapted to encircle the hub, and a weight section 23. The band has threaded in its upper part a plug 24 in which is formed a duct 25 which communicates with the lower end of the tube 26.

The weight section 23 has formed therein a vertical passage 27 which is in communication with a restricted inlet 28, there being a cylindrical plunger 29 located in the passage, and having its upper end extended into the space between the ends of the sections 18—18, said plunger being of a diameter slightly less than that of the passage. An adjusting screw 30 is threaded in the lower end of the plunger and is of less diameter than the inlet 28 in which it is engaged.

It will be of course understood that the reservoir is filled with lubricant to such a level that the upper end of the tube 26 will extend thereabove.

Briefly the operation is as follows:—

A portion of the pressure fluid entering the bores 14 and 15 will flow through the tube 26 into the reservoir and create a pressure therein substantially equal to the pressure in the bores 14 and 15. When the pressure fluid is admitted to the tool or machine which is to be operated, the pressure in the bores will drop slightly below the pressure in the reservoir. The excess pressure in the reservoir will tend to force lubricant through the passage 27 and will also tend to move the plunger 29 upwardly in the passage. The pulsations of pressure in the line caused by the operation of the tool make the operation continuous, tending to reciprocate the plunger 29 and force intermittent jets of lubricant through the passage 27 into the stream of fluid to mingle therewith. Due to the small clearance between the plunger 29 and the passage 27, a film of lubricant will be retained by capillary action between the plunger and the wall of the passage. Upon upward movement of the plunger a quantity of lubricant equal to the unit volume of the film, multiplied by the length of movement of the plunger will be discharged into the stream of pressure fluid. It will be evident therefore, that the amount of lubricant delivered to the air stream is determined largely by the stroke of the plunger 29 and that this quantity can be varied at will by adjustment of the screw 30.

The capillary action of the plunger maintains the quantity of lubricant delivered by the air stream substantially constant irrespective of variations in the maximum and minimum pressures ocurring during the pulsations so long as the pressure difference is sufficient to cause reciprocation of the plunger 29. In the event the effective pressure difference is relatively large a certain quantity of lubricant will be forced out of the passage 27 even if the plunger 29 is not allowed to reciprocate. In such cases the quantity of lubricant delivered may be adjusted by tightening the screw 30 to bring the lower end of the plunger 29 close to the tapered lower end of the passage 27 and thereby restrict the maximum opening at this point.

What is claimed is:

1. An air line lubricator, comprising a reservoir for containing lubricant, hollow trunnions fitted in the ends of the reservoir and having their opposed faces formed with circular recesses, a hub consisting of hollow sections having their outer end rotatably engaged in the recesses, a pendulum including a band for engagement with the hub, said pendulum having a passage therein, a plunger mounted in the passage, a tube carried by the band and extended above the level of the lubricant in the reservoir, said plunger being adapted to be reciprocated by the pulsations of the pressure fluid passing through the trunnions and hub sections, and means to adjustably restrict longitudinal movement of the plunger carried thereby.

2. An air line lubricator, comprising a reservoir for containing lubricant, hollow trunnions fitted in the end thereof, and having their opposed faces provided with circular recesses, a hanger consisting of complementary hollow sections having their outer ends rotatably engaged in the recesses and their opposed ends mounted in spaced relation and providing a hub, a pendulum including a band for engaging the hub, the pendulum having a passage therein affording communication between the reservoir and interior of the hub, a plunger in the passage and reciprocated by the pulsation of pressure fluid passing through the trunnions and hub, means for limiting the reciprocating movement of the plunger carried by the plunger, and a tube carried by the band and extended above the level of the lubricant in the reservoir.

3. In an air line lubricator comprising a reservoir, a hollow hub rotatably supported therein, a pendulum supported by the hub and having a passage therein for conducting lubricant from the reservoir into the hub when pressure fluid flows through said hub, an end of said passage being restricted to form a seat, a plunger carried in said passage adapted to rest upon the seat, adjustable means carried by said plunger and disposed through the restricted passage to limit longitudinal movement thereof to vary the flow of lubricant flow through said last mentioned passage, a tube carried by the pendulum for conducting pressure fluid flow from the hub to the reservoir.

In testimony whereof I affix my signature.

ALFRED G. SLATCHER.